United States Patent
Lund-Laverick et al.

(10) Patent No.: US 11,286,908 B2
(45) Date of Patent: Mar. 29, 2022

(54) WIND TURBINE BLADE AND METHOD OF ASSEMBLY OF BLADE ELEMENTS TO FORM A WIND TURBINE BLADE

(71) Applicant: LM WIND POWER US TECHNOLOGY APS, Kolding (DK)

(72) Inventors: Michael Lund-Laverick, Kolding (DK); Hans Minnee, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 209 days.

(21) Appl. No.: 16/615,670

(22) PCT Filed: May 22, 2018

(86) PCT No.: PCT/EP2018/063371
§ 371 (c)(1),
(2) Date: Nov. 21, 2019

(87) PCT Pub. No.: WO2018/215457
PCT Pub. Date: Nov. 29, 2018

(65) Prior Publication Data
US 2020/0088169 A1 Mar. 19, 2020

(30) Foreign Application Priority Data
May 22, 2017 (EP) .................................... 17172187

(51) Int. Cl.
*F03D 13/10* (2016.01)
*F03D 1/06* (2006.01)

(52) U.S. Cl.
CPC .......... *F03D 13/10* (2016.05); *F03D 1/0675* (2013.01); *F05B 2230/604* (2013.01);
(Continued)

(58) Field of Classification Search
CPC ........ F03D 13/10; F03D 1/065; F03D 1/0675; F03D 1/0683; F03D 3/062;
(Continued)

(56) References Cited

U.S. PATENT DOCUMENTS 7,521,105 B2 * 4/2009 Bech ..................... B29B 11/16
428/60
7,922,454 B1 * 4/2011 Riddell .................. F03D 80/30
416/224

(Continued)

FOREIGN PATENT DOCUMENTS

DE  10 2008 055 513 A1  6/2009
EP       1310351 A1     5/2003
(Continued)

OTHER PUBLICATIONS

International Search Report dated Aug. 21, 2018 issued in corresponding International Application No. PCT/EP2018/063371.

*Primary Examiner* — Brian P Wolcott
(74) *Attorney, Agent, or Firm* — Nath, Goldberg & Meyer; Jerald L. Meyer; Tanya E. Harkins

(57) ABSTRACT

A method of assembling a wind turbine blade from wind turbine blade elements is provided. The method comprises joining the elements via a taper joint around the whole circumference of the blade.

16 Claims, 6 Drawing Sheets

Figure 1:
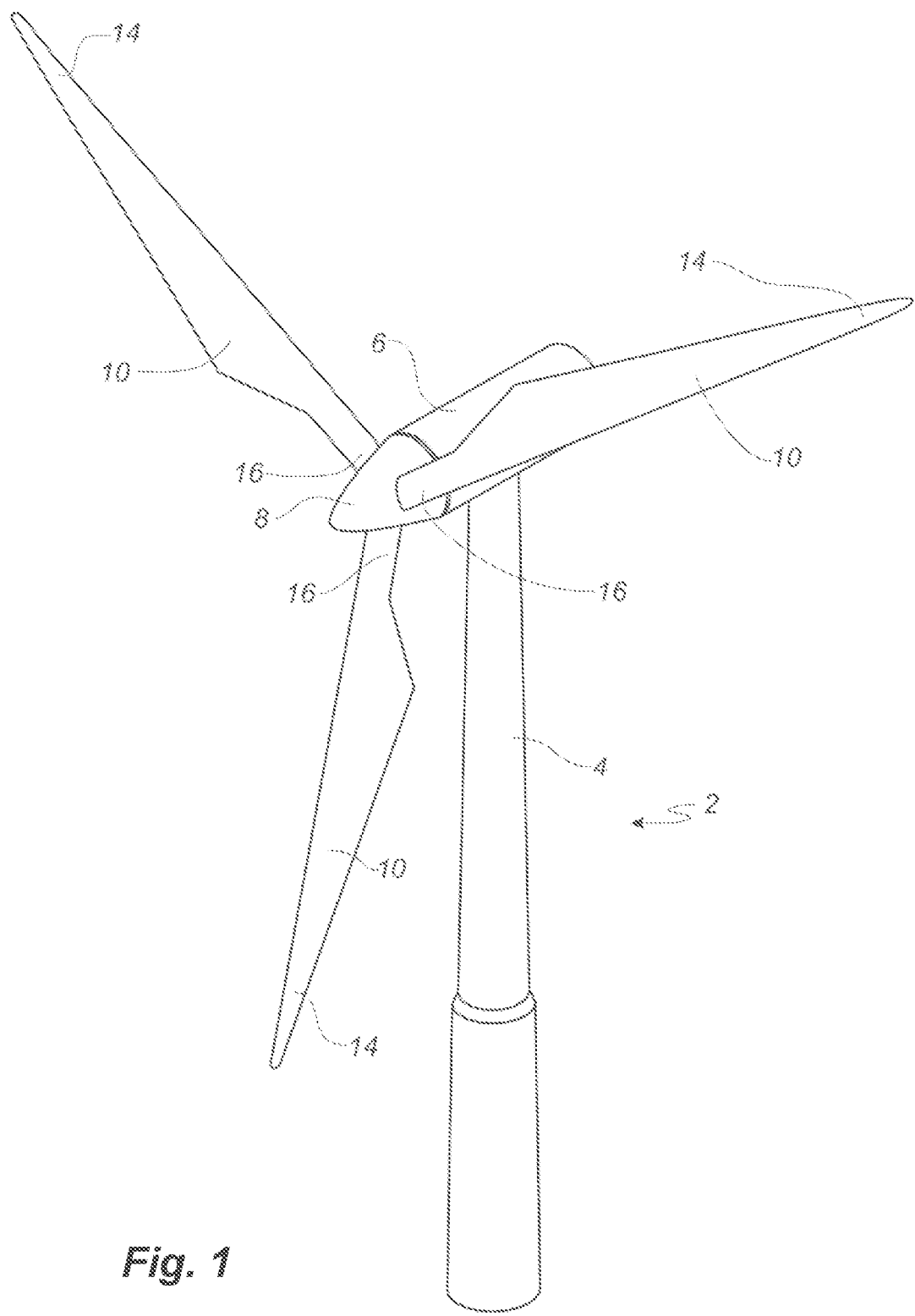

(52) U.S. Cl.
CPC ... *F05B 2240/302* (2013.01); *F05B 2250/292* (2013.01); *F05B 2280/6003* (2013.01)

(58) Field of Classification Search
CPC ............ F05B 2230/604; F05B 2230/50; F05B 2230/60; F05B 2240/302; F05B 2250/292; F05B 2260/30; F05B 2280/6003

See application file for complete search history.

(56) References Cited

U.S. PATENT DOCUMENTS

| | | | | |
|---|---|---|---|---|
| 8,221,085 | B2* | 7/2012 | Livingston | B29C 66/54 |
| | | | | 416/226 |
| 8,764,401 | B2* | 7/2014 | Hayden | F03D 1/0675 |
| | | | | 416/213 R |
| 9,050,786 | B2* | 6/2015 | Fredskild | B29C 70/304 |
| 10,451,030 | B2* | 10/2019 | Hayden | F03D 1/0675 |
| 2009/0162208 | A1 | 6/2009 | Zirin et al. | |
| 2016/0369771 | A1 | 12/2016 | Feigl | |
| 2021/0086463 | A1* | 3/2021 | Barton | B29C 65/78 |

FOREIGN PATENT DOCUMENTS

| | | |
|---|---|---|
| EP | 2116359 A1 | 11/2009 |
| EP | 2418072 A1 | 2/2012 |
| EP | 2808157 A1 | 12/2014 |
| WO | 2012/019888 A1 | 2/2012 |

* cited by examiner

WIND TURBINE BLADE AND METHOD OF ASSEMBLY OF BLADE ELEMENTS TO FORM A WIND TURBINE BLADE

This is a National Phase Application filed under 35 U.S.C. 371 as a national stage of PCT/EP2018/063371, filed May 22, 2018, an application claiming the benefit of European Application No. 17172187.1, filed May 22, 2017, the content of each of which is hereby incorporated by reference in its entirety.

FIELD OF THE INVENTION

The invention relates to the field of wind turbine blades. In particular, the invention relates to wind turbine blades made from blade elements and a method to join such blade elements.

BACKGROUND

Wind turbine blades usually comprise two half shells of fibre reinforced resin moulded in two open moulds, one for each half shell, the half shells being joined with adhesive at the leading- and trailing edges of the blade substantially along the full length of the blade. Alternatively, a wind turbine blade may also be made according to a one-shot method, where the full blade is infused with resin in a closed mould, as described in, for example, EP 1 310 351 and EP 2 116 359. This one-shot process omits the adhesive joints at the leading- and trailing edges of the blade, but is more complicated to practice than the process involving half shells.

Modern wind turbine blades are typically over 40 meters long, and recently, blades close to 90 meters have been launched. It is expected that the development of even longer blades will contribute to reduce the cost of energy, especially in the off-shore wind industry.

Accordingly, it has been suggested to assemble wind turbine blades from shorter blade elements. The assembly of these elements can then be done at a facility close to the site where the wind turbine blade is erected or at least close to a harbor, minimizing or eliminating road- or rail transport of the long wind turbine blade. It may be easier and less costly to transport shorter blade elements.

US 2016/0369771 discloses blade modules for a wind turbine blade designed to be coupled via protruding spar cap segments. A combination of spar cap segments and brackets for joining wind turbine blades are disclosed in US 2009/0162208.

WO 2012/019888 discloses a method of manufacturing two wind turbine shell parts which can later be joined to form a wind turbine blade shell.

EP 2 418 072 A1 relates to a method of moulding different sections of a wind turbine blade by arranging a fibre lay-up in a first longitudinal section of a mould, placing a polymer foil over an edge area of the fibre lay-up, and placing another fibre lay-up in another section of the mould such that the lay-ups overlap. The area of overlap between the fibre lay-ups may taper gradually.

DE 10 2008 055 513 A1 relates to a system for assembling a wind turbine blade by providing two segments which are glued together. The segments may have tapered geometries.

There is a continuing need for robust methods for assembling wind turbine blades from blade elements, in particular because blade parts are typically fairly long and flexible, creating challenges in their correct alignment and joining.

SUMMARY

The invention relates to a method of assembling at least a part of a wind turbine blade by joining a first element of the wind turbine blade with a second element of the wind turbine blade, the first element comprising a first aerodynamic shell having an inner circumference, and the second element comprising a second aerodynamic shell having an outer circumference, the first aerodynamic shell and the second aerodynamic shell comprising a resin infused fibre material, the method comprising the steps of:

a) manufacturing the first element, the first element having the first aerodynamic shell tapered in thickness around the inner circumference of the first element towards said first end, defining a first tapered section, b) manufacturing the second element, the second element having the second aerodynamic shell tapered in thickness around the outer circumference of the second section towards said second end, defining a second tapered section c) aligning the first element and the second element, the first end facing the second end, d) inserting the second tapered section at the second end into the first tapered section at the first end, and e) joining the first element and the second element with adhesive, wherein step a) of manufacturing the first element comprises at least one verification step of a desired geometry of the first tapered section by measuring against a master tool reflecting the desired geometry of the first tapered section and/or wherein step b) of manufacturing the second element comprises at least one verification step of a desired geometry of the second tapered section by measuring against a master tool reflecting the desired geometry of the second tapered section.

The present invention thus enables to manufacture at least a part of wind turbine blade from separate blade elements by using a taper joint covering the full circumference of the blade at the area of the joint. In this way, one pre-fabricated element can be joined with another pre-fabricated element by aligning the two elements and inserting one element into the other and filling the gap formed between the male tapered section and the female tapered section with a suitable adhesive. Thereby, a uniform and structurally advantageous joint is formed and minimal additional work is required in the form of overlamination and the like. After joining, the joining section is almost invisible from the outside, and the required work for finishing the aerodynamic surface around the joint is minimal.

The present inventors have found that the verification step of measuring against a master tool reflecting the desired geometry of the first and/or second tapered section is an efficient approach to ensuring a desirable, repeatable fit between first and second elements, such as root end and tip end blade elements. This may be combined with subsequent machining and/or processing to ensure full control of the desired geometry of the blade elements. In particular, the method of the present invention enables a controlled and repeatable adhesive joint thickness, such that the gap between the two tapered surfaces is reduced to a minimum. Thus, the methods described herein lead to a reduction in occurrence of uneven surfaces in the area of the joint and in the reduction of misalignments between different blade elements, which results in an overall reduction of time and costs.

It is preferred that the master tool is arranged on at least part of the inner circumference of the first element in the first tapered section. In some embodiments, the master tool may be also arranged on at least part of an outer circumference of the first element. It is also preferred that the master tool is arranged on at least part of the outer circumference of the second element in the second tapered section.

According to a preferred embodiment, the master tool extends at least along the tapered section of the respective blade element. Preferably, it extends along the tapered section and part of a non-tapered section of the respective blade element. Preferably, the master tool has a length of at least two meters, more preferably at least five meters, most preferably at least ten meters.

It is particularly preferred that the same master tool or master tools, such as the same first master tool and the same second master tool, is used in a method for joining a plurality of respective first elements of the wind turbine blade with respective second elements of the wind turbine blade. For example, a given first master tool could be used to verify a desired geometry of the tapered section of 10 or more, 50 or more, or 100 or more first elements, and a given second master tool could be used to verify a desired geometry of the tapered section of 10 or more, 50 or more, or 100 or more second elements of a wind turbine blade.

It should be noted that the term "tapered surface" in this context includes, besides a gradual decrease in wind turbine blade shell thickness, also irregular shapes such as a curved tapering surface and is not limited to strictly linear taper.

Furthermore, in this context, step d) of inserting the second (male) tapered section into the first (female) tapered section also encompasses the covering of the second tapered section with the first tapered section or a situation, where both sections are moved simultaneously in the insertion process.

It may be needed to do finishing work on the seam created were the female surface meets the male surface after gluing them together, but to a much lesser extent when compared to prior art scarf joints or combinations of scarf—taper- and/or butt joints.

It has been found that that the inventive method adds little or no extra weight to the wind turbine blade when compared to one-piece blades, functional characteristics being the same.

The step of joining the blade elements with adhesive may include additional fibre reinforcement laid up on the tapered sections prior to adding adhesive.

Also, spacer elements may be used between the tapered sections to ensure a minimum distance adequate for obtaining enough space between the tapered section after insertion for a suitable amount of adhesive to fill that space and thereby obtaining a robust joint.

In an embodiment of the invention the first tapered section has a length of 10-50% of the length of the first element.

In an embodiment of the invention the first element and the second element are manufactured at different locations.

The method allows for utilizing blade elements that are manufactured at specialized locations. For example, a blade element comprising the root section requires specialized root layup where fastening means for mounting the wind turbine blade to the hub of a wind turbine are embedded in the root laminate structure. A blade element comprising the tip section may require specialized embedding of lightning receptor systems in the laminate or mounting of such systems after manufacturing of such tip section. Furthermore, the tip-end of a wind turbine blade often needs special erosion protection due to the high operational tangential speed of the tip-end of the wind turbine blade which makes the erosion by particles or rain more severe towards the tip end, especially around the leading edge of the blade.

A blade element comprising an intermediate section between a root-comprising element and a tip-comprising element may comprise an important part of the load bearing structure in the form of, for example, a main laminate.

The joining of the blade elements may thus be applied at a facility specialized in blade assembly from pre-fabricated elements. Preferably, such assembly is done close to the site of erection of the wind turbine(s) or at least close to a harbour or railway, whereby the transportation of the final blade by truck on public roads is minimized or even avoided.

It should be noted that the term "different locations" comprises separate factories being physically distant from each other, but also specialized locations within the same factory complex.

Step a) of manufacturing the first element may comprise at least one verification step of a desired geometry of the first tapered section by measuring against a master tool reflecting the desired geometry of the first tapered section. The master tool used in step a) may be a tool having substantially the reverse profile of a desired geometry of at least part of the first tapered section of the first element.

The method of the present invention is particularly advantageous when every first element matches every second element. This means that at the assembly stage, no sorting or special matching of first sections and second sections is required, because a desired fit of the taper joint is achieved for all combinations of first- and second sections.

For example, a wind turbine blade assembled by the present method may comprise a first element made in factory A and a second element made in factory B without any further selection or matching necessary prior to assembly.

Step b) of manufacturing the second element may comprise at least one verification step of a desired geometry of the second tapered section by measuring against a master tool reflecting the desired geometry of the second tapered section. The master tool used in step b) may be a tool having substantially the reverse profile of a desired geometry of at least part of the second tapered section of the second element.

Typically, a first master tool is used in step a), and a second master tool is used in step b). Usually, the shape of the first master tool is different than the shape of the second master tool. In some embodiments, the present method comprises using a root end master tool and a tip end master tool for a verification step of a desired geometry of respective tapered sections of a root end blade element and a tip end blade element.

The verification step may, according to embodiments of the invention, also be advantageous for the second tapered section. There may be cases where the moulding process of the first- and/or second aerodynamic shells is not precise enough to create the desired geometries for the taper joint. For these embodiments, testing against a master tool may reveal any deficiencies in geometry of the first and/or second tapered sections and enable corrections and adaptions to be made to ensure that the first and second elements are fully interchangeable regardless of manufacturing location.

According to an embodiment of the invention the master tool comprises a plurality of adjustable measuring pins.

In an embodiment of the invention the master tool is designed to measure deviations from an ideal desired geometry by measuring positive- (too much material) and negative deviations (too little material) with a master tool having adjustable measuring pins integrated.

According to further embodiments of the invention step a) of manufacturing the first element comprises the step of recording a deviation from the desired geometry of the first tapered section and adjusting a geometry of the first tapered section by removing resin infused fibre material from at least parts of the first tapered section and/or by adding resin and optionally also fibre material to at least part of the first tapered section to achieve the desired geometry of the first tapered section.

According to embodiments of the invention step b) of manufacturing the second element comprises the step of recording a deviation from the desired geometry of the second tapered section and adjusting a geometry of the second tapered section by removing resin infused fibre material from at least part off the second tapered section and/or by adding fibre material and resin to the second tapered section to achieve the desired geometry of the second tapered section.

According to embodiments of the invention the method may include adjustment steps that adjust the geometry of the first-and/or second tapered surfaces. Material, such as resin with fibre reinforcement, may be added to areas that lack material compared to the desired geometry according to the master tool. The adjustment step may alternatively or additionally comprise removal of excess material as measured against the master tool.

Such material removal may be done manually or by semi-automated or automated processes such as milling, abrading, sanding or any other suitable process known in the art.

Adding material may, for example, be done by manual layup of glass followed by resin infusion and curing in a process of over-lamination, or by using resin pre-impregnated patches, so called pre-pregs or by 3-D printing.

In an embodiment of the invention the second element is a root-end element and the first element is a tip-end element, the root-end element and the tip-end element together amount to the full length of the wind turbine blade.

In an advantageous embodiment, the wind turbine blade is manufactured from only two elements: A tip-end element and a root-end element. In this case, only one bond line is necessary and the assembly of the wind turbine blade and the logistics around the method of assembly becomes simple when compared to a blade made from 3 or more elements.

It is considered advantageous by the present inventors to apply the female taper to the tip-end element according to these embodiments of the invention, but it should be noted that it is also possible to have the tip-end element being the second element and the root-end element to be the first element.

According to embodiments of the invention the tip-end element has a length of between 5-50% of the length of the wind turbine blade, such as between 10-40% of the length of the wind turbine blade.

According to embodiments of the invention, tip-end elements are manufactured to have a certain length. If the tip-end element is very short, below 5% of the blade length, the transport advantage of blades may diminish, because, bearing in mind the total length of modern wind turbine blades often being above 40 m, 50 m, or even 70 m or 80 m, it is desirable to be able to reduce the length of the corresponding root-end element more considerably at a given blade length to allow for road transportation on trucks.

If the tip-end element becomes very long, above 50% of the blade length, it may become very heavy and approaching the weight of the root-end element, whereby both elements will require very specialized transport equipment.

According to embodiments of the invention step b) of manufacturing the second element further comprises to form two half shells, joining the two half shells with adhesive at bond lines at a leading edge and a trailing edge, whereby the two half shells form the second aerodynamic shell and step a) of manufacturing the first element comprises forming the first element in a one-shot process as one unit without bond lines at a leading edge and a trailing edge, thereby forming the first aerodynamic shell.

It has been found by the present inventors that it may be advantageous to manufacture the first element by the somewhat more elaborate one-shot process, while the second element is manufactured by the more commonly applied process of making two half shells which are subsequently joined. Applying the one-shot process for the first element allows for a more precise moulding of the first tapered surface, minimizing the need for corrections of the out-of-mould geometry of the first tapered section to achieve the desired geometry. With the one-shot process applying a closed mould system and not needing any further step of joining two half shells, the geometry of the taper is fixed by the mould with inner mould parts installed. This allows for a more precise geometry to be obtained.

In advantageous embodiments the first element is an element not comprising the root section of the blade and the transition zone, but comprising an airfoil section and/or a tip section.

In an embodiment of the invention the first element and/or the second element is equipped with a rigid and removable bulkhead at the first end and/or the second end prior to an infusion of fibre material with resin during step a) of manufacturing the first element and/or during step b) of manufacturing the second element.

Shrinkage compensation means may, according to embodiments of the invention, be used to preserve the desired geometries of the tapered sections forming the joint section between the blade elements during the resin curing process, where shrinkage of the re-enforced material may occur. Such shrinkage may slightly deteriorate the geometry of the first and/or second elements around the first and/or second end if not compensated for.

According to embodiments of the invention step e) of joining the first element and the second element with adhesive comprises applying adhesive to the second tapered section at the second end prior to inserting the second tapered section into the first tapered section. A suitable amount of adhesive is applied to the second tapered section prior to insertion. In this way it may be secured that the entire surface is covered with adhesive, because the surface is still visible prior to insertion.

To avoid the two tapered sections to directly touch without adhesive there between, an adhesive comprising glass beads or other means for securing a minimal bond width, such as spacing elements placed in the gap between the tapered surfaces, may be applied before joining.

If desired, also one or more layers of fibre re-enforcements may be placed in this area before joining to improve the strength and durability of the joint.

In an embodiment of the invention step e) of joining the first element and the second element with adhesive comprises to drill at least one hole through the first aerodynamic shell at the first tapered section, inserting the second tapered section into the first tapered section, and injecting adhesive through the at least one hole to substantially fill a space between the first tapered section and the second tapered section with adhesive.

According to embodiments of the invention, adhesive is injected through one or more holes into a space formed between the tapered surfaces. By placing the injection hole(s) carefully it may be secured that substantially all the space formed is filled with adhesive, thereby obtaining a durable joint, It may be advantageous according to embodiments of the invention to provide control means within the space formed between the tapered surfaces to secure that adhesive is filling up the space. A simple way of performing such control is to provide one or more further holes along the injection path in through the surface of the first tapered section through which adhesive can visibly escape to the outside, indicating an adhesive-filled space. As previously mentioned, spacing elements may be provided on the surfaces to be joined by adhesive or distance means may be integrated in the adhesive, and layers of fibre material may also be provided on the tapered sections for joint re-enforcement.

The injection of adhesive into the space between the tapered surfaces may be assisted by vacuum applied to the gap area. By covering the outer surface around the joint of the two elements with a vacuum tight removable sealing, such as simple vacuum foil or a sealing device, adapted to the outer surfaces of the aerodynamic shells near the joint area, the space between the tapered surfaces can be subjected to a reduced pressure which can help to draw adhesive into the space.

In an embodiment of the invention the second tapered section comprises a sealing means around the circumference, the sealing means being arranged to abut against the first tapered section substantially at the narrow end of the first tapered section after inserting the second tapered section into the first tapered section to prevent adhesive from passing into an interior space of the assembled blade beyond the tapered sections.

According to embodiments of the invention it may be advantageous to provide a seal substantially at the narrowest end of the second tapered section to prevent excess adhesive from flowing beyond the desired taper joint and into the interior space of the blade. This may lead to additional costs due to excessive use of adhesive and to excess weight which is undesirable. The already mentioned vacuum assisted injection of adhesive may also benefit from such seals.

In an embodiment of the invention step c) of aligning the first element and the second element comprises arranging one or more lasers and one or more optical sensors on an outer surface of the first element and on an outer surface of the second element.

Alignment of the elements prior to joining may, according to an embodiment of the invention, benefit from using laser alignment tools. Precise alignment of the blade elements may be advantageous because the joining of the elements, if precisely aligned, can be done fast and reliable with no or only minor correctional movements of the elements required during joining. Thereby, it may simultaneously be achieved that the joint area is acceptable with respect to structural requirements that the outer aerodynamic surface tolerances may be complied with.

In an embodiment of the invention step c) of aligning the first element and the second element comprises fixation of one of the first element and the second element and manipulating the non-fixated first element or second element in a device allowing 6-axis adjustment of the non-fixated first element or second element, to obtain alignment for step d) of inserting the second tapered section at the second end into the first tapered section at the first end.

Fixing one element in a suitable position and being able to manipulate the other element allows for a convenient and flexible alignment step. The device could, for example, comprise a blade element cart, a blade element cradle or some other fixture having 6-axis movability. The manipulation of the non-fixated element may be done by motor driven mechanisms, by manually operated mechanisms, semi-automatic—or automatic mechanisms, or a combination.

In another aspect, the present invention relates to a method of assembling at least a part of a wind turbine blade by joining a first element of the wind turbine blade with a second element of the wind turbine blade, the first element comprising a first aerodynamic shell having an inner circumference, and the second element comprising a second aerodynamic shell having an outer circumference, the first aerodynamic shell and the second aerodynamic shell comprising a resin infused fibre material, the method comprising the steps of:

a) manufacturing the first element, the first element having the first aerodynamic shell tapered in thickness around the inner circumference of the first element towards said first end, defining a first tapered section, b) manufacturing the second element, the second element having the second aerodynamic shell tapered in thickness around the outer circumference of the second section towards said second end, defining a second tapered section c) aligning the first element and the second element, the first end facing the second end, d) inserting the second tapered section at the second end into the first tapered section at the first end, and e) joining the first element and the second element with adhesive.

This further method may be combined with the aforedescribed embodiments and features as discussed for the previous method.

In another aspect, the present invention relates to a master tool for verifying a desired geometry of a tapered section of a wind turbine blade element in a method of assembling at least a part of a wind turbine blade by joining a first element of the wind turbine blade with a second element of the wind turbine blade. The master tool may comprise a plurality of adjustable measuring pins, preferably for contacting a surface and/or circumference of the blade element. The master tool may be arranged to measure deviations from an ideal desired geometry by measuring positive- (i.e., indicating a surplus of material at that point of the surface) and negative deviations (indicating a lack of material at that point of the surface) using integrated adjustable measuring pins.

It is preferred that the pins of the master tool are arranged such that one or more pins may contact an outer circumference of the blade element and/or an inner circumference of the blade element. Each master tool may comprise five or more, preferably ten or more, such as 20 or more adjustable measuring pins.

In some embodiments, the master tool comprises two parts which are hingedly connected. Thus, the master tool may be opened on one side with one or more calibrated hinges for convenient placement and removal. In a preferred embodiment, the master tool comprises a plurality of adjustable measuring pins integrated in the master tool such that one or more pins may contact an aerodynamic outer surface of the wind turbine blade element, and one or more pins may contact a tapered section of the wind turbine blade element, when the master tool is arranged on the blade element.

Typically, the master tool will comprise a plurality of movable measuring pins, each pin being preferably translationally movable within a bore provided in the master tool. One or more pins may be arranged to touch the tapered surface of the blade element, thus bridging a gap between master tool and the tapered surface. In some embodiments, each measuring pin has the form of a threaded pin. In some embodiments, each pin comprises a rounded probe head for enabling a smooth contact with the surface of the blade element. In a preferred embodiment, each pin comprises a height indicator, such as a colour coded or other height indicator area. The height indicator may have a male threaded and lockable end which can be connected to the probe head, which may be calibrated and locked before use.

Preferably, each pin is spring-loaded. Thus, the pin may extend towards the surface of the blade element such that the probe head touches the surface. If the surface at a given point is higher as desired, the pin is pushed outward and the height indicator may indicate such condition, for example by colour coding. Likewise, if the surface at a given point is lower than desired, the pin is pushed inward and the height indicator may indicate such condition. The indicator may indicate at least three conditions, for example by colour coding, wherein a first condition is a surface level within the desired specification, wherein a second condition is a surface level which is lower than the desired specification, and wherein a third condition is a surface level which is higher than the desired specification. In other embodiments, the master tool may comprise one or more sensors, such as electronic sensors, for depth position measuring.

The invention also relates to a wind turbine blade assembled by the methods as described herein.

In an embodiment of the invention, the wind turbine blade comprises two elements:

a first element, the first element having a first aerodynamic shell tapered in thickness around the inner circumference of the tip-end element towards a first end, defining a first tapered section, and a second element, the second element having a second aerodynamic shell tapered in thickness around the outer circumference of the second element towards said second end, defining a second tapered section, the first element being a tip-end element and the second element being a root-end element, the root-end element and the tip-end element together amount to the full length of the wind turbine blade, the first element and the second element being joint by a taper joint by inserting the second tapered section into the first tapered section, wherein the root-end element is produced from two half shells joined at bond lines at a leading edge and a trailing edge, whereby the two half shells form the second aerodynamic shell and the tip-end element is produced in a one-shot process as one unit without bond lines at a leading edge and a trailing edge, thereby forming the first aerodynamic shell.

DETAILED DESCRIPTION OF THE INVENTION

The invention is explained in detail below with reference to embodiments shown in the drawings.

Figure 2:
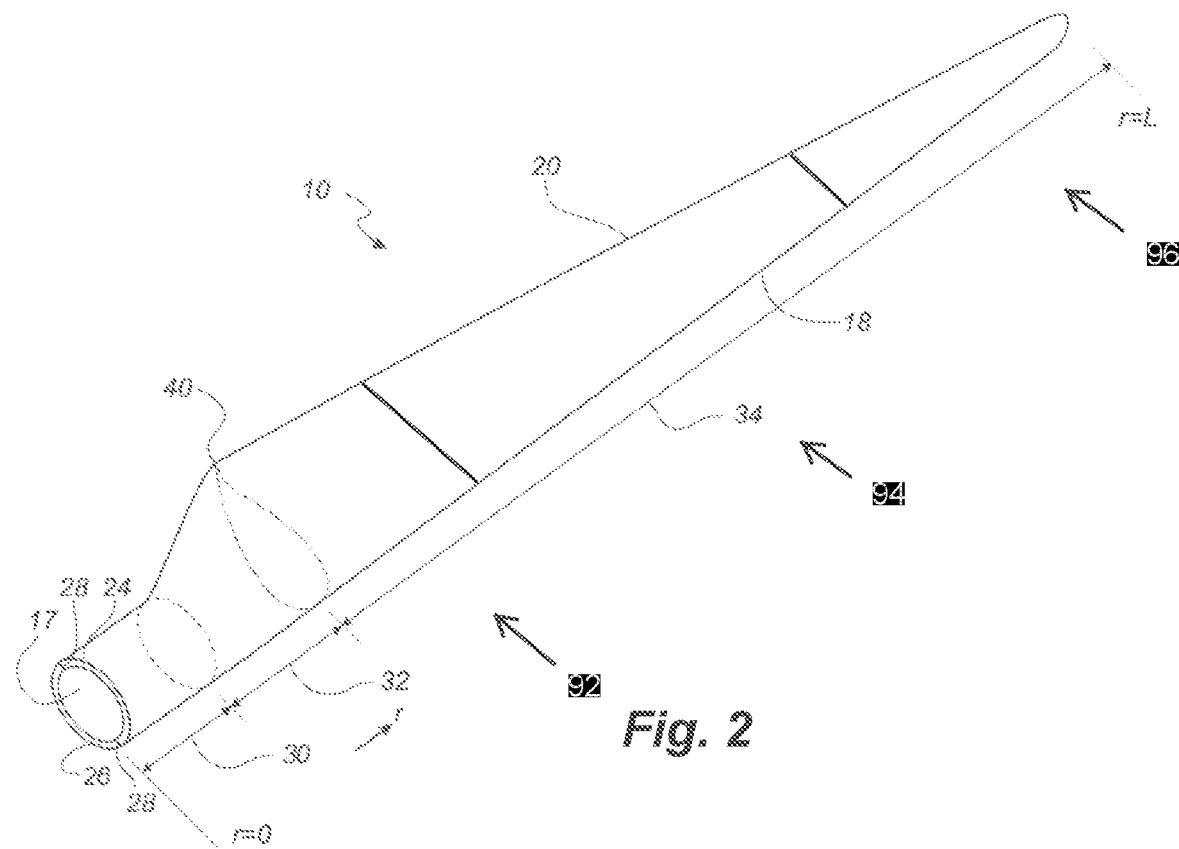
Figure 3:
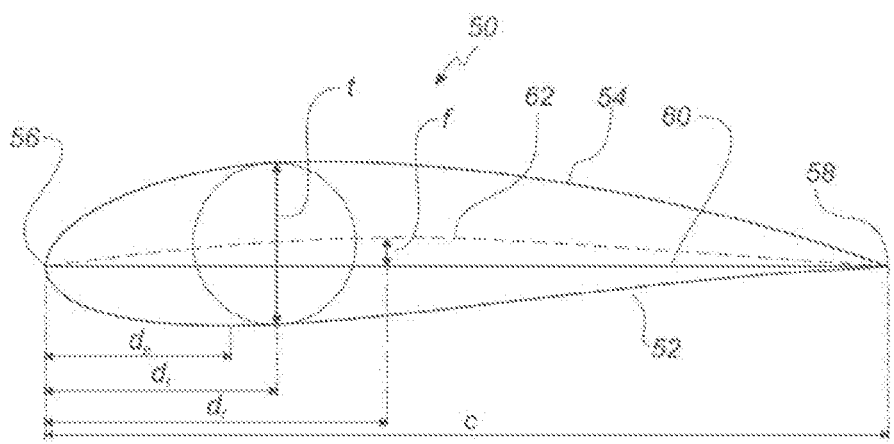
Figure 4:
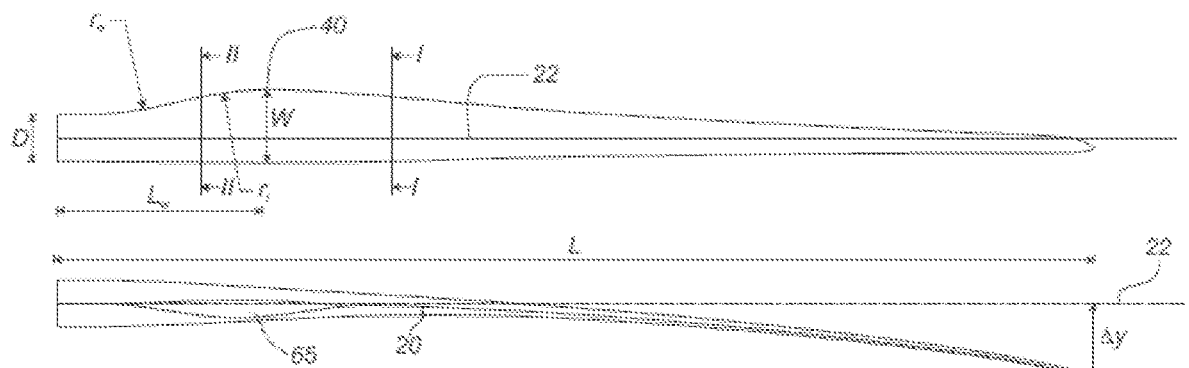
Figure 5:
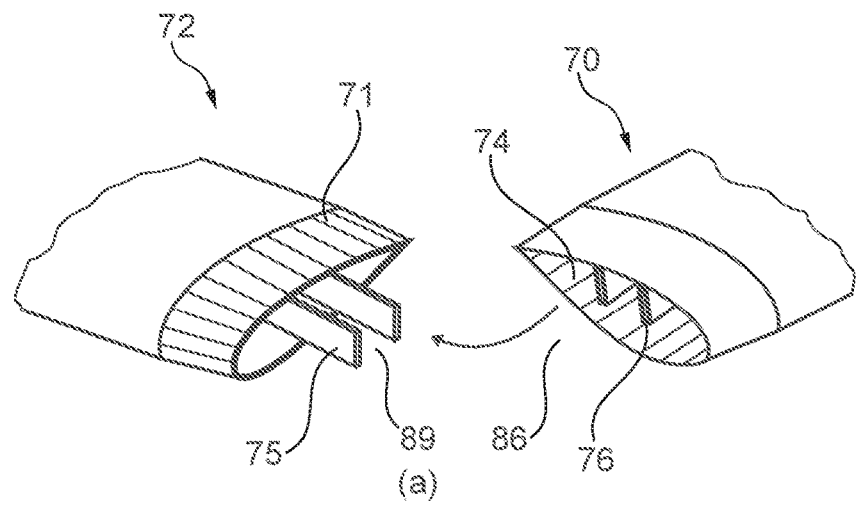
Figure 5:
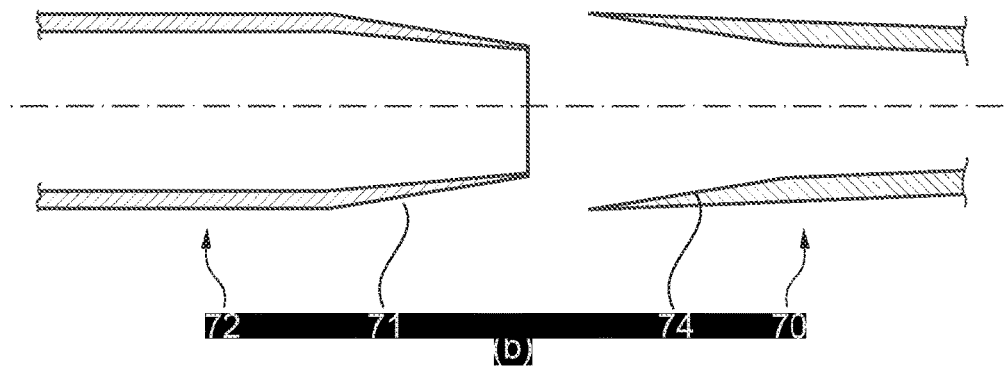
Figure 6:
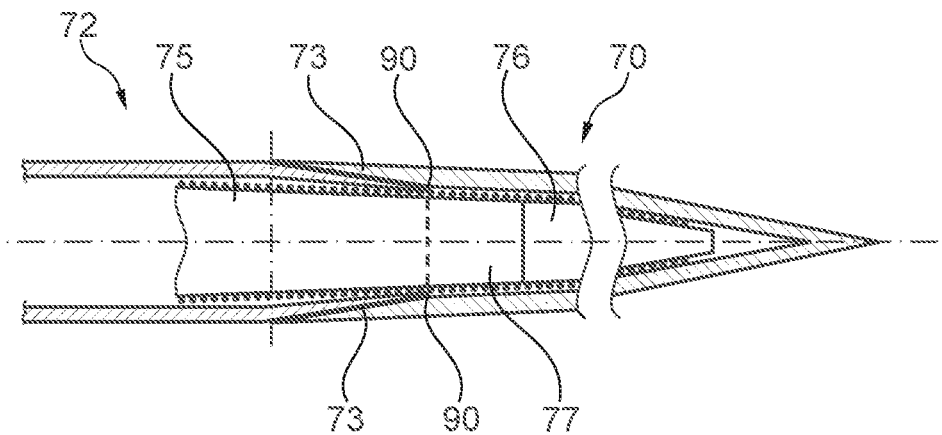
Figure 7:
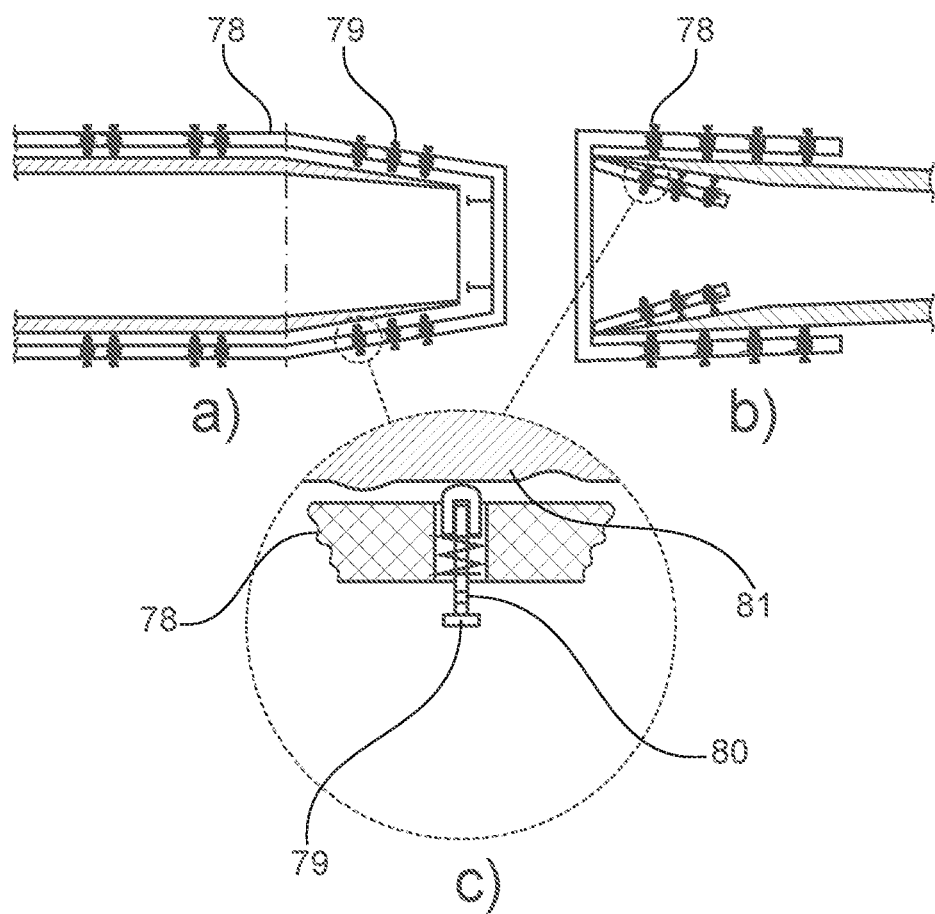
Figure 8:
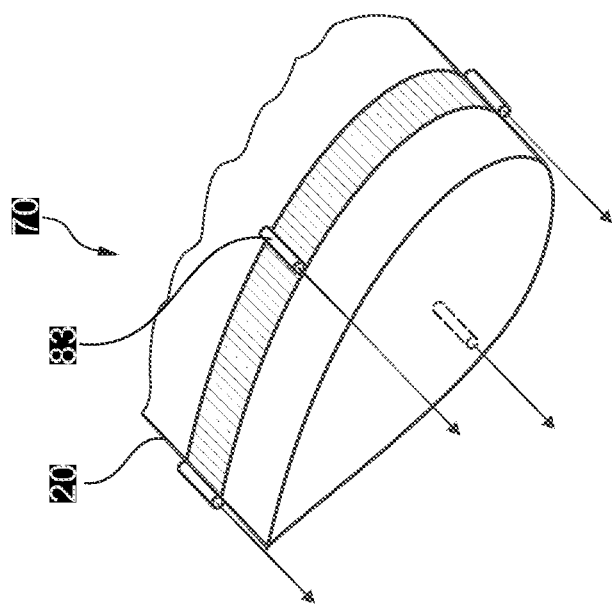
Figure 8:
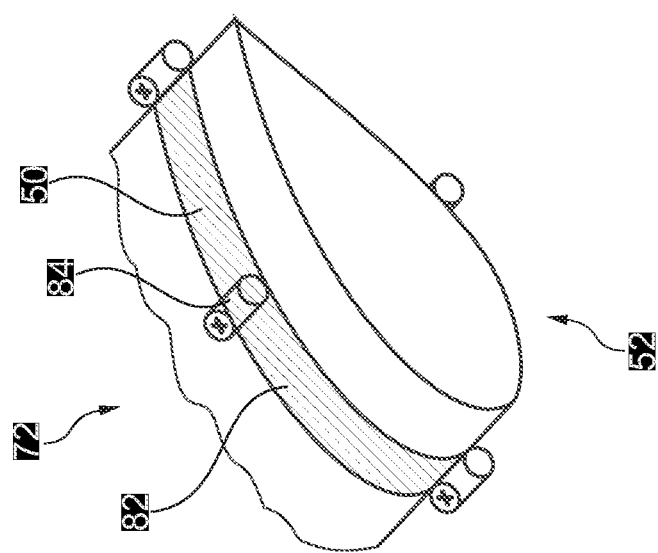
Figure 9:
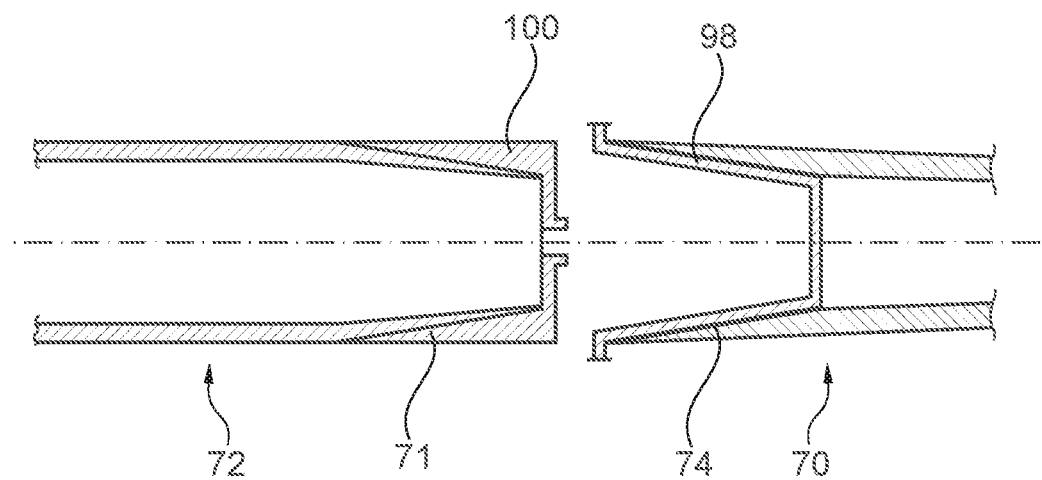

FIG. 1 shows a wind turbine,
FIG. 2 shows a schematic view of a wind turbine blade,
FIG. 3 shows a schematic view of an airfoil profile though a section in the airfoil region of the blade,
FIG. 4 shows a schematic view of a wind turbine blade seen from above and from the side,
FIGS. 5(a) and (b) show schematic views of blade elements around the joint area,
FIG. 6 shows blade elements after joining with adhesive,
FIGS. 7(a), (b) and (c) show schematic views of geometry verification via master tools,
FIG. 8 shows a schematic view of blade elements arranged with alignment means,
FIG. 9 shows schematic views of the blade elements equipped with shrinkage compensation means.

It should be noted that the figures are not drawn to scale, and any indication of a length on a figure cannot be used to assess any other length or distance on the same figure or other figures.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is assembled from 3 elements 92, 94, 96. The elements are joined by the method according to the invention.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side (or upwind side) 52 and a suction side (or downwind side) 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is optionally provided with a pre-bend, which is defined as Δy, which corresponds to the out of plane deflection from a pitch axis 22 of the blade.

FIGS. 5(*a*) and 5(*b*) show two elements 70, 72, of a wind turbine blade which can be joined according to the invention. A first element 70 has a first tapered surface 74 tapering around the inner circumference towards a first end 86 of the part forming a female tapered surface. A second element 72 has a second tapered surface 71 tapering around the outer circumference towards a second end 89 of the part forming a male tapered surface. The first element can receive the second element after alignment of the two elements.

FIG. 5(*a*) shows shear beams 75, 76. If necessary these may be connected in various ways known in the art. Glue joints may typically be used, such as butt joints, taper joints, scarf joints and the like.

FIG. 5(*b*) shows a sectional side view of the two blade elements to be connected. In an embodiment, where the full blade length is consisting of only to blade elements, the first (female) element 70 is the tip-end element, and the second (male) element 72 is the root-end element, the tip-end element is made in a one-shot moulding process in a closed mould, while the root-end element is made by first manufacturing two half shells each in a separate mould. The half shells are then joined by adhering them to each other at the leading edge and trailing edge to form the root-end element. The one-shot process is known in the art and comprises steps of:

1) lay up of fabric on a lower mould surface,
2) including balsa and/or foam components,
3) provide inner mould components which could be made from any suitable material (wood, rubber, metal, air-filled bladder etc.),
4) lay up of further fabric on the inner mould components,
5) including further balsa and/or foam components
6) close the mould with an upper mould
7) infuse with resin and cure
8) de-mould the full tip-end element, An advantage according to this embodiment is that only two parts need to be joined to assemble the blade. Since the one-shot procedure is somewhat more complicated than the more common half shell manufacture and joining, the tip-end manufacture may be done at a specialized facility. According to an embodiment of the invention, the same tip-end may be used for different blades. Accordingly, root-end elements of different designs and lengths may be joined with the same tip-end elements to assemble wind turbine blades of different length and root-end element design but with equal tip-end elements. By using substantially identical tip-end elements for several blade designs, the number of (identical) tip-end elements to be produced goes up and the tip-end manufacture may be considerably optimized with respect to tooling, moulding, in particular, the described one-shot moulding, and automated processes may become economically feasible when compared to more manual processes normally used for the production of blade elements in lower numbers.

FIG. 6 shows the second element 72 and the first element 70 after assembly.

A taper joined around the circumference of tapered sections 71, 74 has been formed and adhesive 73, and optionally fibre re-enforcement, is filling the gap between the tapered sections. According to this embodiment, a shear beam 75 of the second element is joined with a shear beam 76 of the first element in a beam joint 77. This joint may be established in any way known in the art and is not critical to the invention.

FIG. 7(*a*) shows the second element having the second tapered section. A master tool 78*a* which optionally can be opened up on one side with one or more calibrated hinges (not shown) for ease of placement and removal, is arranged to assess the geometry of the second tapered section via measuring pins 79. FIG. 7(*b*) shows the first element having the first tapered section 74; a master tool 78*b* is arranged to assess the geometry of the first tapered section via measuring pins. These pins or calibrated studs are resting on both the aerodynamic outer surface as well as on the first- and second tapered sections.

FIG. 7(*c*) is an enhanced view of measuring pins 79. The measuring pins can be can be adjusted to touch the tapered surface 81, thereby covering a gap between master tool 78 and the tapered surface 81. According to embodiments of the invention, the measuring pin has the form of a threaded pin having a smoothly rounded probe and a colour coded or other height indicator area 80 which has a male threaded and lockable end connected to the probe head which is calibrated and locked before use. By spring load the pin will extend toward the surface area to be measured until the head touches the tapered surface 81, and is pushed back accordingly while the colour code or other indicator means indicates if the tapered section for a specific position is either A: within specification, B: Outside specification, material needs to be added or C: Outside specification, material needs to be removed.

As an alternative variant these functions may be automated by electric depth position measuring sensors connected to an electronic device translating these signals into an output resulting in a readable joint surface area map identifying areas to be corrected on the bases of the acceptable tolerance band. Such data output may further be used by calibrated automatic CNC machinery able to remove material (for example a 5-axis grinding robot) or to add material (for example a 3-D printing machine) as and where required.

This assessment and, if necessary, the corresponding adjustment of the geometry of the tapered sections may ensure that every first element can be assembled with every second element, if the manufacturing process for making the blade elements is not precise enough to guarantee a desired geometry of all tapered sections.

The exact geometry of the tapered section is important both to achieve easy insertion of the male part into the female part and also to achieve a suitable distance or gap between the tapered sections after insertion to leave room for adhesive and thus achieve a predictable bond-line. The distance or gap should preferably be between 0.5 mm and 10 mm, more preferably between 1 mm and 6 mm.

Material may be added to a tapered section by the layup of fabric on the tapered surface followed by wetting with resin and curing of the resin. The layup may also include pre-impregnated fibre (pre-pregs).

Material may be removed from a tapered section, for example, by grinding or sanding. This may be done by hand or by robotic machinery.

The tapered sections 71 and 74 are preferably created in the moulding process of elements 70 and 72. When demoulded, the elements thus have the required tapered sections for assembly of the elements. Alternatively, the second tapered section 71 and/or the first tapered section 74 are prepared fully or in part by sanding and/or grinding of the respective surface areas of the moulded elements. This may be done by automated processes involving CNC-machinery, such as a five-axis sanding machine/robot.

FIG. 8 shows elements 70 and 72 equipped with alignment means in form of lasers 83 and optical sensors 84. These may be mounted on a frame 82. In the embodiment shown, 4 lasers are mounted on the first element 70 at the trailing edge 20, at the leading edge and at positions there between on the upwind side and on the downwind side, respectively. Analogously, the optical sensors are mounted on the second element 72. During the alignment, one blade element may be fixed while the other blade element is moved to achieve suitable alignment as required by the sensor system.

It may be desirable to move the smallest blade element while keeping the larger element stationary, both during alignment and during assembly/joining.

In an embodiment of the invention, the tip-end element is moved both during alignment and insertion of the second tapered section into the first tapered section, while the root-end section is kept stationary.

FIG. 9 shows means 98, 100 for shrinkage compensation fitted to the first and second tapered sections of the first- and second element, respectively. When manufacturing the blade elements, the process comprises infusing fibre re-enforcement with resin and curing the resin. During the resin cure, shrinkage of the fibre re-enforced material may occur which, in some cases, could lead to a slight alteration of the desired geometry of the tapered sections. These alterations by shrinkage may be minimized or avoided by fitting shrinkage compensation means on the tapered section, for example, in the form of specially designed bulk heads. Thereby the desired geometry for joining the blade elements may be better preserved, enhancing the forming of a joint without- or with only little need for post-moulding adjustment of the geometries of the tapered sections.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
70 first element
71 second tapered section
72 second element
73 adhesive
74 first tapered section
75 shear webs of second element
76 shear webs of first element
78a,b master tool
79 measuring pin
80 colour coding
81 tapered surface
82 frame
83 laser
84 optical sensor
86 first end
89 second end
90 sealing means
92, 94, 96 blade elements
98 shrinkage compensation means, first tapered section
100 shrinkage compensation means, second tapered section
c chord length
$d_t$ position of maximum thickness
$d_f$ position of maximum camber
$d_p$ position of maximum pressure side camber
f camber
L blade length
r local radius, radial distance from blade root
t thickness
Δy prebend

The invention claimed is:

1. A method of assembling at least a part of a wind turbine blade (10) by joining a first element (70) of the wind turbine blade (10) with a second element (72) of the wind turbine blade (10),
   the first element (70) comprising a first aerodynamic shell having an inner circumference, and
   the second element (72) comprising a second aerodynamic shell having an outer circumference,
   the first aerodynamic shell and the second aerodynamic shell comprising a resin infused fibre material,
   the method comprising the steps of:
   a) manufacturing the first element (70), the first element having the first aerodynamic shell tapered in thickness around the inner circumference of the first element towards a first end (86), defining a first tapered section (74),
   b) manufacturing the second element (72), the second element having the second aerodynamic shell tapered in thickness around the outer circumference of the second section towards a second end (89), defining a second tapered section (71),
   c) aligning the first element (70) and the second element (72), the first end (86) facing the second end (89),
   d) inserting the second tapered section (71) at the second end (89) into the first tapered section (74) at the first end (86), and
   e) joining the first element (70) and the second element (72) with adhesive (73), wherein step a) of manufacturing the first element comprises at least one verification step of a desired geometry of the first tapered section (74) by measuring against a master tool (78) reflecting the desired geometry of the first tapered section and wherein step b) of manufacturing the second element comprises at least one verification step of a desired geometry of the second tapered section (71) by measuring against a master tool (78) reflecting the desired geometry of the second tapered section.

2. The method according to claim 1, wherein the first tapered section (74) has a length of 10-50% of the length of the first element (70).

3. The method according to claim 1, wherein the first element (70) and the second element (72) are manufactured at different locations.

4. The method according to claim 1 wherein the master tool comprises a plurality of adjustable measuring pins (79).

5. The method according to claim 1 wherein step a) of manufacturing the first element comprises the step of recording a deviation from the desired geometry of the first tapered section and adjusting a geometry of the first tapered section by removing resin infused fibre material from at least parts of the first tapered section and/or by adding resin and optionally fibre material to at least part of the first tapered section to achieve the desired geometry of the first tapered section.

6. The method according to claim 4, wherein step b) of manufacturing the second element comprises the step of recording a deviation from the desired geometry of the second tapered section and adjusting a geometry of the second tapered section by removing resin infused fibre material from at least part off the second tapered section and/or by adding resin and optionally fibre material to the second tapered section to achieve the desired geometry of the second tapered section.

7. The method according to claim 1, wherein the second element is a root-end element and the first element is a tip-end element, the root-end element and the tip-end element together amount to a full length of the wind turbine blade.

8. The method according to claim 7 wherein the tip-end element has a length of between 5-50% of the length of the wind turbine blade, such as between 10-40% of the length of the wind turbine blade.

9. The method according to claim 1, wherein step b) of manufacturing the second element further comprises forming two half shells, joining the two half shells with adhesive at bond lines at a leading edge and a trailing edge, whereby the two half shells form the second aerodynamic shell and step a) of manufacturing the first element comprises forming the first element in a one-shot process as one unit without bond lines at a leading edge and a trailing edge, thereby forming the first aerodynamic shell.

10. The method according to claim 1, wherein the first element and/or the second element is equipped with a rigid and removable bulkhead (98, 100) at the first end (86) and/or the second end (89) prior to an infusion of fibre material with resin during step a) of manufacturing the first element and/or during step b) of manufacturing the second element.

11. The method according to claim 1, wherein step e) of joining the first element and the second element with adhesive (73) comprises applying adhesive to the second tapered section at the second end prior to inserting the second tapered section into the first tapered section.

12. The method according to claim 1, wherein step e) of joining the first element and the second element with adhesive comprises drilling at least one hole through the first aerodynamic shell at the first tapered section, inserting the second tapered section into the first tapered section, and injecting adhesive through the at least one hole to substantially fill a space between the first tapered section and the second tapered section with adhesive.

13. The method according to claim 1 wherein the second tapered section comprises a sealing means (90) around the outer circumference, the sealing means being arranged to abut against the first tapered section substantially at the narrow end of the first tapered section after inserting the second tapered section into the first tapered section to prevent adhesive from passing into an interior space of the assembled blade beyond the tapered sections.

14. The method according to claim 1, wherein step c) of aligning the first element and the second element comprises arranging one or more lasers (83) and one or more optical sensors (84) on an outer surface of the first element and on an outer surface of the second element.

15. The method according to claim 1, wherein step c) of aligning the first element and the second element comprises fixation of one of the first element and the second element and manipulating the non-fixated first element or second element in a device allowing 6-axis adjustment of the non-fixated first element or second element, to obtain alignment for step d) of inserting the second tapered section at the second end into the first tapered section at the first end.

16. A wind turbine blade assembled according to the method of claim 1,
   wherein the first element comprises a tip-end element,
   wherein the second element comprises a root-end element,
   wherein the root-end element and the tip-end element together amount to a full length of the wind turbine blade,
   wherein the first element and the second element are joined by a taper joint by the insertion of the second tapered section into the first tapered section, and wherein the root-end element is produced from two half shells joined at bond lines at a leading edge and a trailing edge, whereby the two half shells form the second aerodynamic shell, and the tip-end element is produced in a one-shot process as one unit without bond lines at a leading edge and a trailing edge, thereby forming the first aerodynamic shell.

* * * * *